United States Patent
Yang et al.

(10) Patent No.: US 7,164,711 B2
(45) Date of Patent: Jan. 16, 2007

(54) PROGRAMMABLE RECEIVE-SIDE CHANNEL EQUALIZER

(75) Inventors: Fuji Yang, Monmouth, NJ (US); Fadi Saibi, Red Bank, NJ (US); Chunbing Guo, Eatontown, NJ (US); Kameran Azadet, Morganville, NJ (US)

(73) Assignee: Agere Systems Inc., Allentown, PA (US)

( * ) Notice: Subject to any disclaimer, the term of this patent is extended or adjusted under 35 U.S.C. 154(b) by 756 days.

(21) Appl. No.: 10/348,871

(22) Filed: Jan. 22, 2003

(65) Prior Publication Data

US 2004/0141552 A1    Jul. 22, 2004

(51) Int. Cl.
*H03H 7/30* (2006.01)
*H04B 3/14* (2006.01)
(52) U.S. Cl. .................... 375/229; 333/28 R
(58) Field of Classification Search ........ 375/229–232, 375/350; 333/18, 28 R, 172, 207; 708/323
See application file for complete search history.

(56) References Cited

U.S. PATENT DOCUMENTS

| 6,300,849 | B1 * | 10/2001 | Takeda .................. 333/202 |
| 6,362,681 | B1 * | 3/2002 | Bollati et al. ............ 327/558 |
| 2003/0020551 | A1 * | 1/2003 | Henkel .................. 331/18 |
| 2003/0095005 | A1 * | 5/2003 | Morie et al. ............ 330/254 |

* cited by examiner

*Primary Examiner*—Don N. Vo

(57) ABSTRACT

A digitally programmable analog receive-side channel equalizer includes N identical zero-positioning (ZP) circuit pairs in a cascade, where the transfer function of one ZP circuit of each pair exhibits a positive zero and the transfer function of the other ZP circuit exhibits a negative zero. By digitally controlling tunable capacitors within the pairs, the equalizer's frequency response and gain can be adjusted, while a controllable (e.g., constant) group delay is maintained. The number of blocks in the cascade can be selected, and each block independently configured, to optimally compensate for high-frequency losses in a wide range of transmission environments. One implementation involves a T-block cascade with output taps that feed a T:1 output selector such that the output of the overall equalizer can be selected to be any one of these taps corresponding to a programmable equalizer of effective length N where $N \leq T$.

28 Claims, 7 Drawing Sheets

PROGRAMMABLE RECEIVE-SIDE CHANNEL EQUALIZER

BACKGROUND OF THE INVENTION

1. Field of the Invention

The present invention relates to serial data communication systems and, more specifically, to channel equalization.

2. Description of the Related Art

As VLSI component geometries continue to shrink, digital speeds on circuit boards and in cables have increased dramatically. At these higher data rates, effects such as loss and loss-induced inter-symbol interference begin to dominate transmission channel degradation factors.

The current standard data rate for backplane interconnects is 2.5 Gb/s. Although, at these frequencies, frequency-dependent loss is not too severe, a pre-emphasis function at the transmitter is sometimes used to compensate for high-frequency loss in the transmission channel.

As communication rates approach 10 Gbps, frequency-dependent loss is a major source of inter-symbol interference. For example, in the common backplane material FR4, the high-frequency loss of a printed wiring board (PWB) trace is approximately 1 dB/inch/10 GHz. For a typical 40-inch interconnect, this represents 40 dB of high-frequency loss.

Transmitter pre-emphasis techniques typically utilize a single-tap or two-tap FIR filter to combat high-frequency loss. These techniques can effectively equalize the channel at lower data rates. However, at higher data rates (e.g., 10 Gbps), the number of taps required in the pre-emphasis filter increases dramatically, which results in high power consumption. Electromagnetic interference (EMI) also becomes an issue as the high-frequency signals are emphasized at the transmitter side. Additionally, to be able to adapt a pre-emphasis filter's transfer function to a particular channel's characteristics, transmit-side pre-emphasis techniques would require a hand-shaking mechanism between a receiver and a transmitter.

Receive-side channel equalization is also used in some systems (e.g., modems). However, these techniques involve the use of high-speed digital circuits employing high-speed, high-resolution (e.g., greater than four bits) analog-to-digital converters. At high data rates (e.g., 10 Gbps), such implementations are impractical, expensive, and consume too much power.

SUMMARY OF THE INVENTION

To address the above-discussed deficiencies of the prior art, one embodiment of this invention is a receive-side channel equalizer with digitally programmable frequency response. The equalizer comprises N identical zero-positioning (ZP) circuit pairs in a cascade where the transfer function of one of the ZP circuits of each pair exhibits a positive zero and the transfer function of the other ZP circuit exhibits a negative zero. The positions of these paired zeros can be set for each pair by digitally controlling variable capacitors within the pairs, allowing adjustment of the frequency response of the equalizer, while maintaining a linear phase shift, or equivalently, a zero or constant group delay for the cascade. Because embodiments of the equalizer of this invention can be implemented using analog components, they are characterized by relatively low power consumption and low cost of implementation for high-speed applications relative to the prior art.

In one embodiment, the number of blocks (N) that are implemented and used in an equalizer cascade is determined prior to manufacture depending on the intended application (e.g., trace length on an FR4 backplane).

In another embodiment, T blocks are implemented in an equalizer cascade. Between one or more pairs of the cascade are output taps that feed a T:1 output selector such that the output of the overall equalizer can be selected to be any one of these taps corresponding to a programmable cascade length equalizer of effective length N where N≦T.

In one embodiment, the present invention is a receive-side channel equalizer comprising a cascade of circuit blocks, each block comprising a pair of zero-positioning (ZP) circuits, wherein the transfer function of one ZP circuit in each pair exhibits a positive zero and the transfer function of the other ZP circuit in each pair exhibits a negative zero.

In another embodiment, the present invention is a method of receive-side channel equalization comprising (a) receiving a signal from a transmission channel at a cascade of circuit blocks, each block comprising a pair of zero-positioning (ZP) circuits, wherein the transfer function of one ZP circuit in each pair exhibits a positive zero and the transfer function of the other ZP circuit in each pair exhibits a negative zero; (b) processing the signal with the cascade; and (c) outputting the result of the processing.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Communication System

Figure 1:
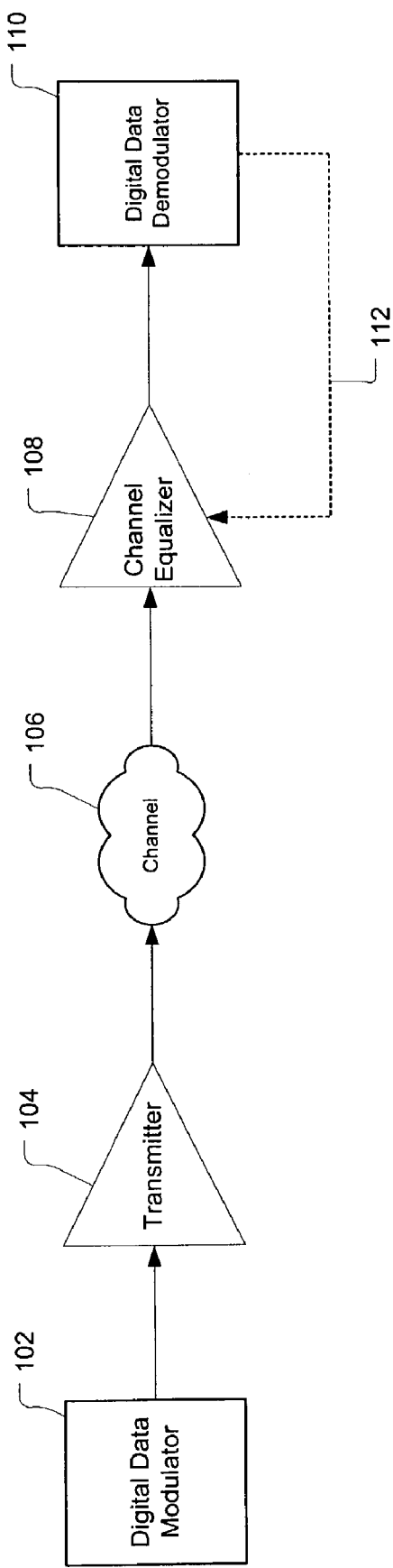
FIG. 1 is a block diagram of a digital communication system according to one embodiment of the present invention.

FIG. 1 is a block diagram of a digital communication system according to one embodiment of this invention. FIG. 1 depicts digital data modulator 102, which modulates (e.g., via non-return-to-zero (NRZ) processing) a signal with a digital bit pattern, and passes the modulated signal to transmitter 104 (e.g., a differential backplane driver). The signal passes through a channel 106 (e.g., a trace on an FR4 backplane) where it is typically subjected to frequency-dependent loss (primarily high-frequency attenuation). It is then processed by channel equalizer 108 where the signal is compensated and adjusted before being passed along to digital data demodulator 110 for clock and data recovery. Optional control path 112 may be used for controlling the characteristics of the channel equalizer based on information derived from the received data.

Channel Equalizer

Figure 2:
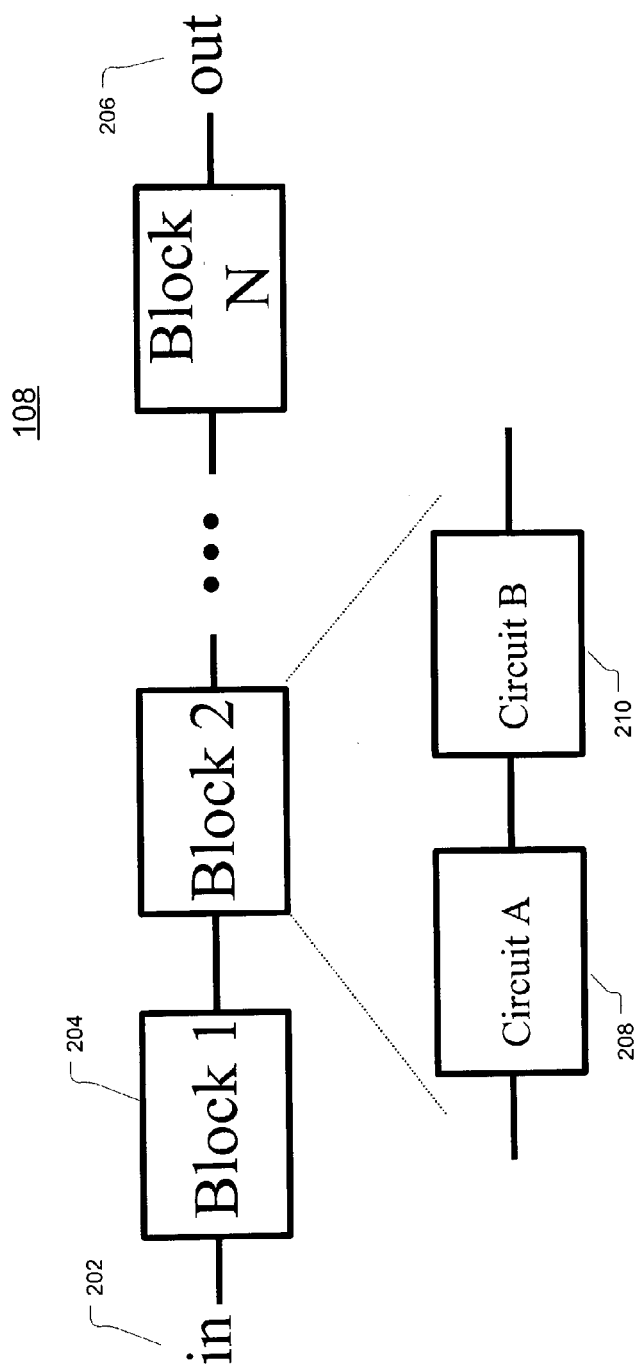
FIG. 2 is a block diagram of one embodiment of channel equalizer 108 of FIG. 1.

FIG. 2 illustrates one embodiment of channel equalizer 108 of FIG. 1. Block 1 of a cascade of N identical processing blocks 204 receives an input signal 202 from a transmission channel, such as channel 106 of FIG. 1. Block 1 processes the signal before passing it along to the next block in the cascade. Each block processes the signal in turn before passing it along to the next block in the cascade. At the end of the cascade, the processed signal 206 is output. Depending on the channel characteristics, the number of blocks (N) that are used, may vary from implementation to implementation. In certain applications, N may be dynamically selected to accommodate changing channel characteristics. For example, the backplane channel characteristics of circuit packs that support hot swapping of boards may change in real time following failure detection and automatic or manual active circuit card replacement or failover. In this case, N can be purposely changed to accommodate the new configuration or may adaptively be changed based on a pre-set equalization optimization algorithm. One such algorithm (e.g., LMS) exhaustively varies values for N within a range until inter-symbol interference is minimized.

Figure 3:
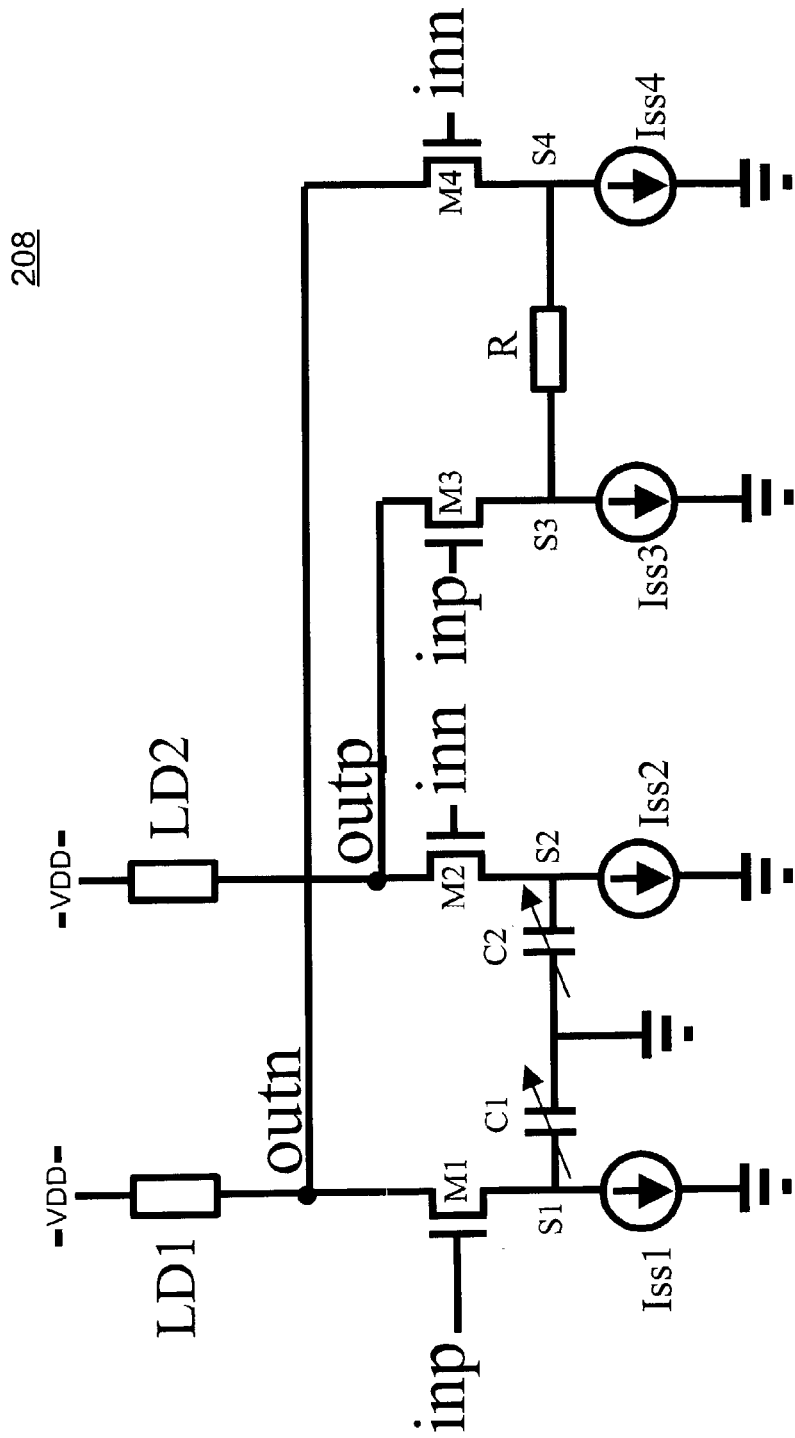
FIG. 3 is a circuit illustrating one implementation for circuit A 208 of FIG. 2
Figure 4:
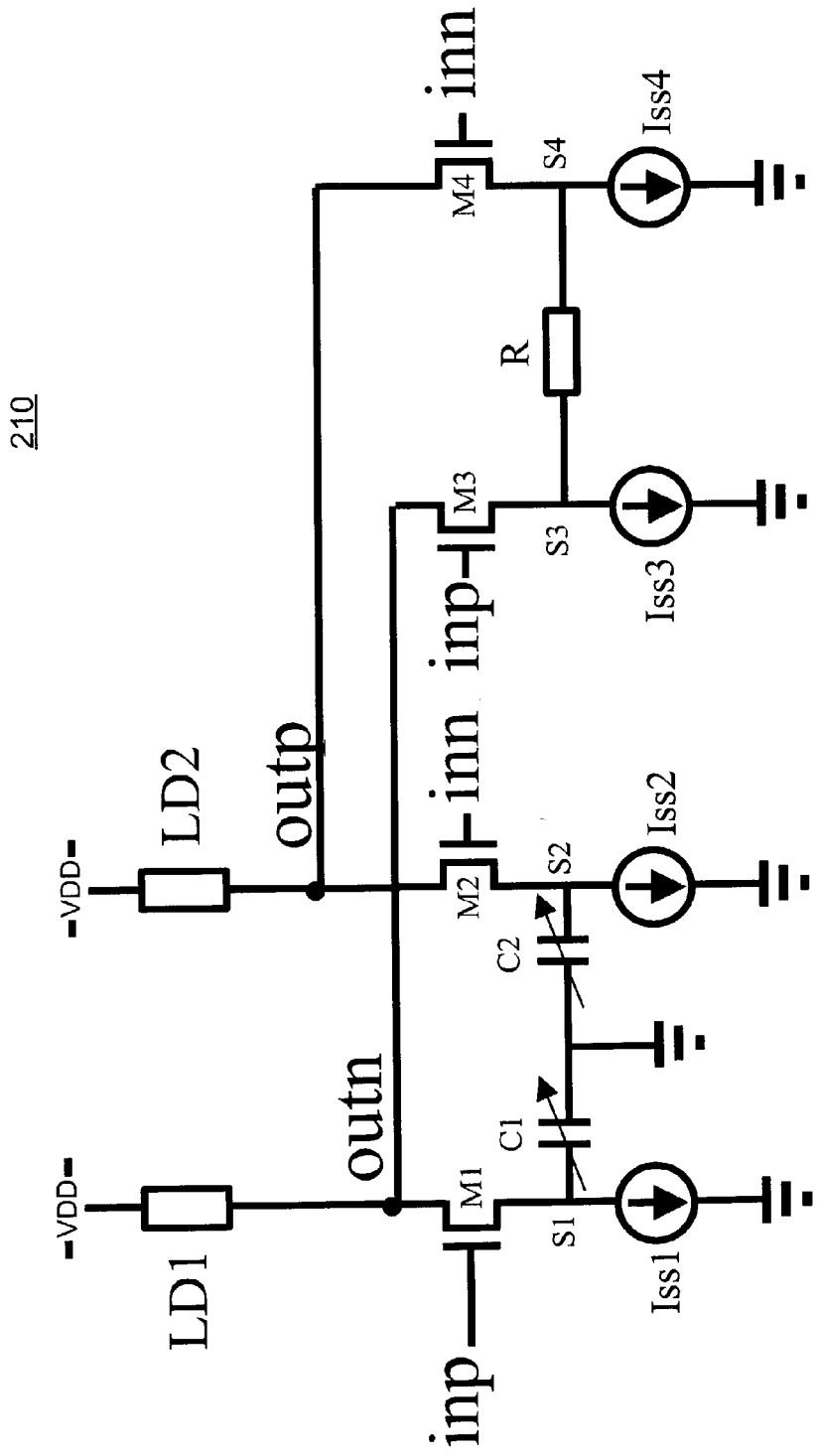
FIG. 4 is a circuit illustrating one implementation for circuit B 210 of FIG. 2.

Each block 204 includes a pair of zero-positioning (ZP) circuits: ZP circuit A 208 and ZP circuit B 210. Possible implementations of circuits A and B are provided in FIGS. 3 and 4, respectively. In FIGS. 3 and 4, the ZP circuit input and output signals are identified by the differential signal pairs [inp, inn] and [outp, outn], respectively; R represents a resistor; C1 and C2 represent tunable capacitors; and VDD is the power supply voltage. Although the circuit depicts transistors M1–M4 of the n-channel metal-oxide-semiconductor field-effect-transistor (MOSFET) type, other transistor types (e.g., bipolar junction transistors, other types of FETs, and GaAs- and CMOS-based devices) may be used.

FIG. 3 depicts ZP circuit A 208 of FIG. 2, which implements a positive zero. Here, a first differential pair of transistors M1 and M2 and current sources Iss1 and Iss2 is source-degenerated by (preferably tunable) capacitors C1 and C2 (where the value of C1 is preferably equal to the value of C2). As shown, C1 is connected between node S1 and ground and C2 is connected between node S2 and ground. A second differential pair of transistors M3 and M4 and current sources Iss3 and Iss4 is source-degenerated with resistor R connected between nodes S4 and S5. To realize a positive zero, the drain of M3 is connected to the drain of M2, and the drain of M4 is connected to the drain of M1.

FIG. 4 depicts ZP circuit B 210 of FIG. 2, which implements a negative zero. This circuit is similar to the circuit of FIG. 3, except here the drain of transistor M3 is connected to the drain of transistor M1 and the drain of transistor M4 is connected to the drain of transistor M2 to yield a negative zero result. Because the circuits of FIGS. 3 and 4 are virtually identical (with the only difference being the way the drains are interconnected), it is possible to achieve good matching between them, and thereby optimally control group delay variations when circuits A and B are cascaded as described previously.

In general, the loads LD1 and LD2 in FIGS. 3 and 4 are complex. However, to simplify the discussion, the loads can be assumed to be purely resistive and equal to one another. In this case, the transfer functions for circuits A and B are respectively:

$$G_A \cdot \frac{1 - s \cdot RC}{1 + s \cdot C/g_m} \text{ (circuit A)} \quad (1)$$

$$G_B \cdot \frac{1 + s \cdot \alpha \cdot RC}{1 + s \cdot C/g_m} \text{ (circuit B)} \quad (2)$$

where $g_m$ is the transconductance of the input transistors of each circuit, $\alpha$ is a constant, and $G_A$ and $G_B$ are the (low-frequency or DC) gains of circuits A and B, respectively. Note that ZP circuits A and B exhibit positive and negative zeros, respectively, with their time constants defined by the product of the resistors and capacitors (RC). The zeros boost the high-frequency components of the input signals according to the values of R and C. If the two zeros are completely opposite ($\alpha=1$), then the cascade of circuits A and B exhibits an approximately constant or zero group delay.

By making the absolute value of the positive zero slightly different from that of the negative zero, the group delay response of the equalizer can be changed. This feature can be used to compensate the group delay distortion introduced by the channel or by the parasitic poles in the equalizer.

The loads LD1 and LD2 of circuits A and B can be resistive, inductive, capacitive, or a combination thereof. If an inductor is connected in series with a load resistor, it can be used to introduce a peaking around the Nyquist frequency by adjusting $$\frac{1}{\sqrt{LC}}.$$

This peaking can provide another high-frequency boost for signals received from the transmission channel. Alternatively, an active inductor can be used as the load to achieve the same response. Additional control of the transfer function of the ZP circuits can be achieved by using different values for LD1 and LD2.

Figure 5:
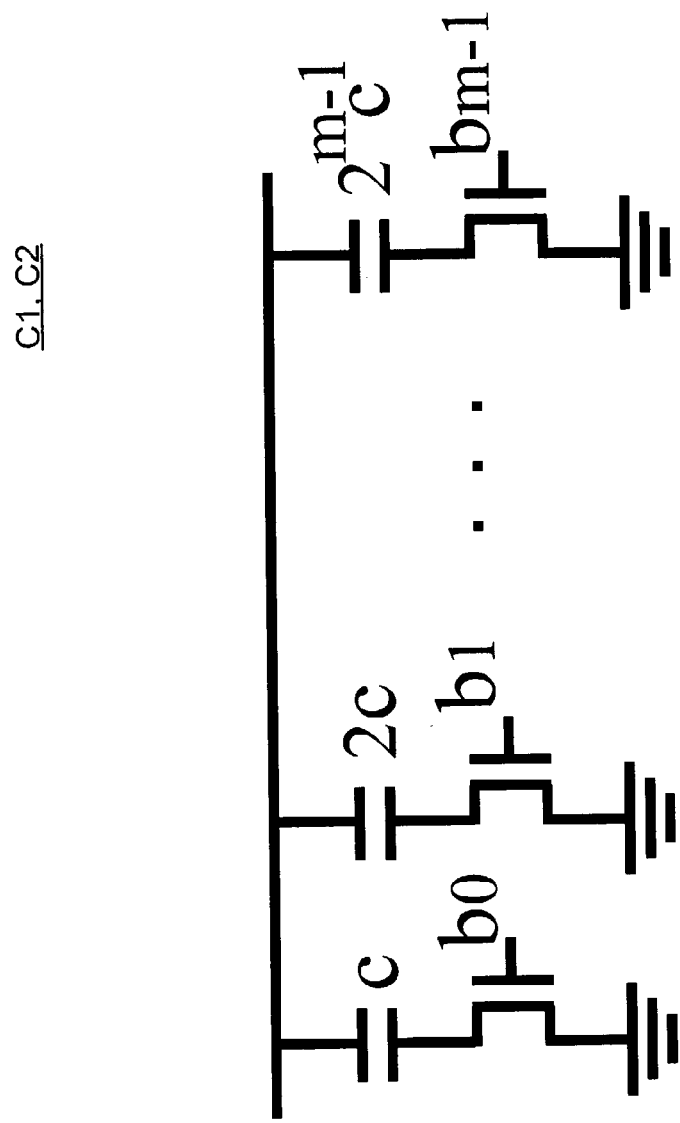
FIG. 5 is a circuit illustrating one implementation for a variable capacitor according to this invention.

The equalizer can be adapted by changing the RC time constant of the zeros. This can be done by adjusting the tunable capacitors, C1 and C2, in circuits A and B. Further, by implementing each tunable capacitor in circuits A and B as a binary weighted capacitor array as depicted in FIG. 5, the group delay can be programmed by a digital control pattern, potentially under the control of a control circuit, which selectively and independently switches on or off the transistors bi, i=0, . . . , m−1, corresponding to the capacitors of the array.

Figure 6:
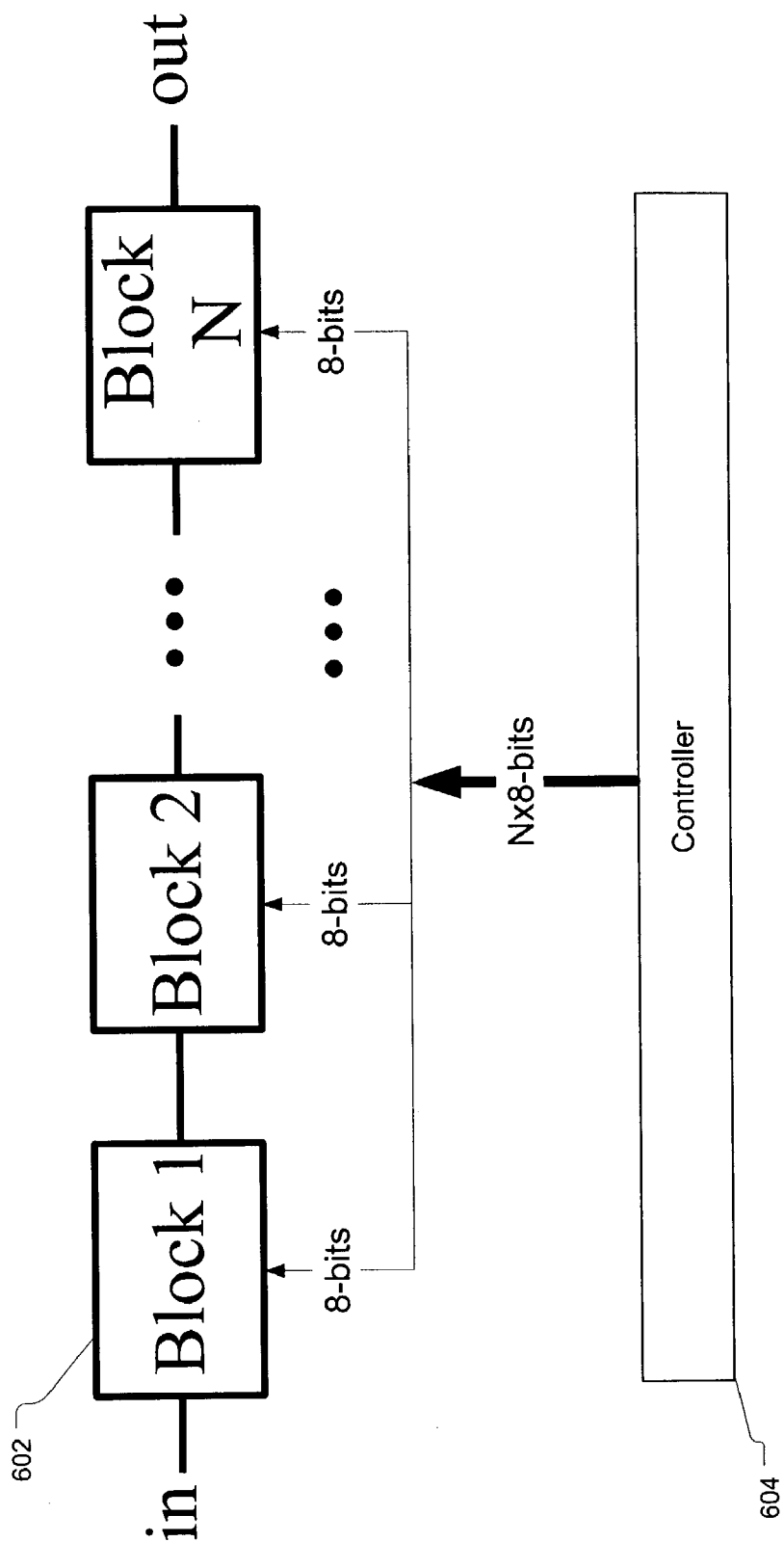
FIG. 6 is a block diagram of another embodiment of receiver 108 of FIG. 1 depicting the digital interface for programming the peaking frequencies and zero positions of the equalizer.

FIG. 6 illustrates an implementation of the latter embodiment. Here, controller 604 provides a data word of width N×8 bits (where N is the number of processing blocks of the equalizer) to the equalizer to tune the capacitors in the equalizer. An 8-bit byte of this word is fed to each processing block 602 within the equalizer to control the variable capacitors within that block. Within each block (not illustrated), the upper 4-bit nibble of the byte is applied to control the capacitors of circuit A and the lower 4-bit nibble of the byte is applied to control the capacitors of circuit B. In this exemplary embodiment, it is assumed that m=4 for each variable capacitor. It is also assumed in this example implementation, that the nibble that is fed to circuit A (the upper nibble) is copied to the 4-bit control of the variable capacitor array of both capacitors of circuit A (i.e., both capacitors C1 and C2 of FIG. 3 are set to the same value). Similarly it is assumed that the nibble that is fed to circuit B (the lower nibble) is copied to the 4-bit control of the variable capacitor array of both capacitors of circuit B (i.e., both capacitors C1 and C2 of FIG. 4 are set to the same value). In alternative implementations, the capacitors for circuits A and B could be individually controlled, fixed in value, partially fixed in value, or include values that are offset relative to each other but adjustable in unison by a common control word. Additionally, m could be larger or smaller than four, more or fewer bits could be provided by controller 604, and one or more of the blocks or circuits could share programming bits.

Figure 7:
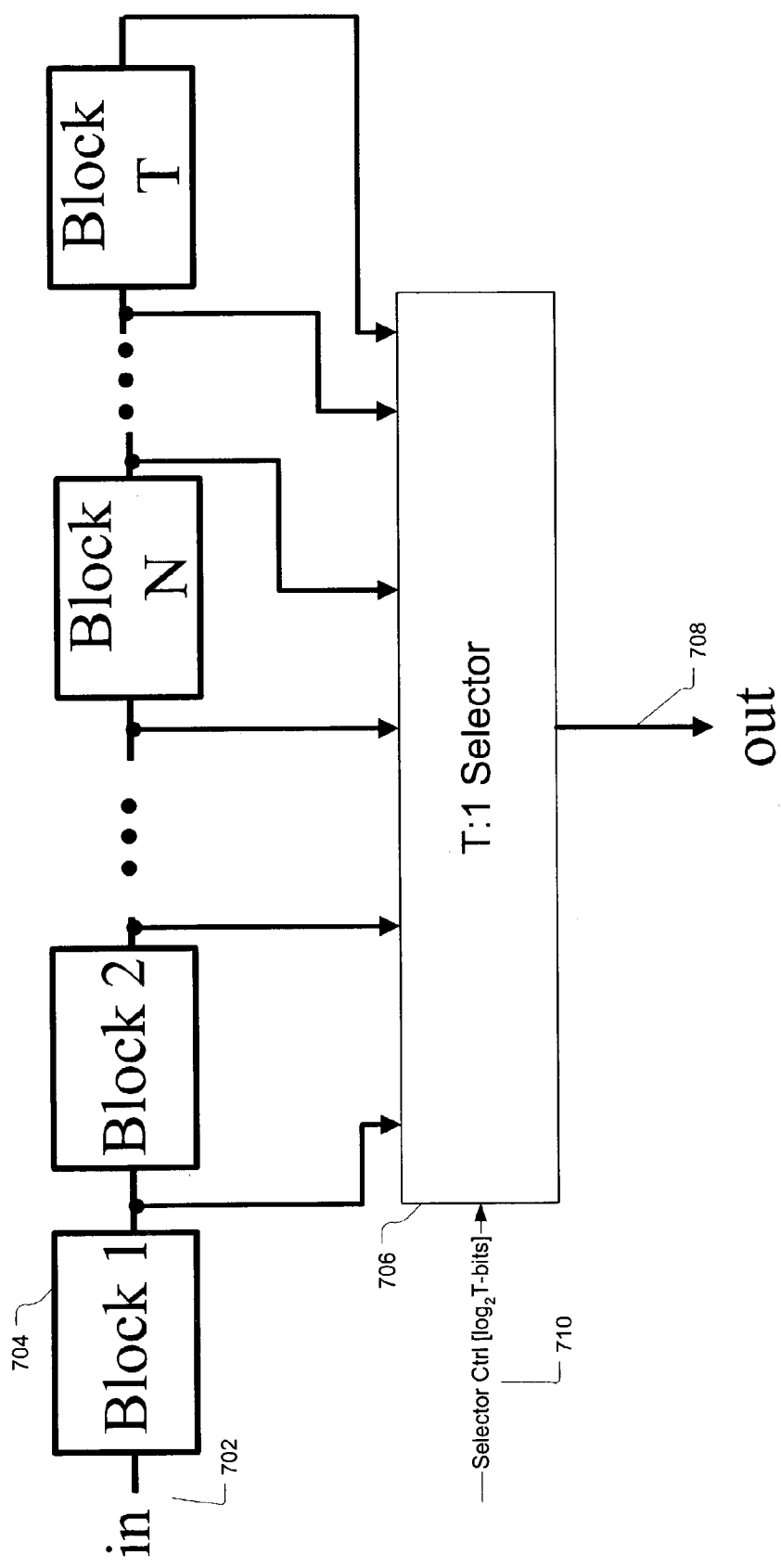
FIG. 7 is a block diagram of another embodiment of receiver 108 of FIG. 1 depicting the selection of one of the cascade pairs for output.

One additional embodiment is illustrated by FIG. 7. Here, the equalizer is implemented as a cascade of T identical processing blocks 704 fed at one end by input signal 702 received from the transmission channel. Between one or more blocks of the cascade are output taps that feed T:1 output selector 706. Selector control 710 is used to choose one of the taps to drive output 708 of the equalizer. This embodiment exhibits the feature of programmable boost based on a programmable cascade length of N selected from a fixed implementation cascade length of T where $N \leq T$.

Each of the aforementioned embodiments addresses the problems of the prior art by replacing a high-power, predetermined-frequency boost, electromagnetic-interference (EMI) generating, transmit-side, pre-emphasis function with a low-power, tunable-frequency boost, low EMI, receive-side equalization function. Additionally, high-speed, digital receive-side equalizers, which use high-speed, high-resolution (e.g., more than four bits), analog-to-digital converters, may be replaced by the embodiments of this invention with low-power analog components. The receive-side equalizer can be constructed or programmed to provide varying degrees of amplification and a constant group delay, while compensating channel or device parasitic poles. It can be implemented in low-cost transistor-based circuitry and tuned using tunable capacitors that are trimmed in manufacture, adjusted or tailored during production test, or implemented as binary weighted capacitor arrays that are controlled via a control circuit (e.g., DIP switch, FPGA, microcontroller, or equivalent mechanism).

While this invention has been described with reference to illustrative embodiments, this description should not be construed in a limiting sense.

Various modifications of the described embodiments, as well as other embodiments of the invention, which are apparent to persons skilled in the art to which the invention pertains are deemed to lie within the principle and scope of the invention as expressed in the following claims.

One or more elements of the present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

Although the equalizer of this invention is described as being capable of a constant group delay, this will be understood to one skilled in the art to be equivalent to a linear phase shift.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A receive-side channel equalizer comprising a cascade of one or more circuit blocks, each block comprising a pair of zero-positioning (ZP) circuits, wherein:
    each ZP circuit is adapted to adjust at least one of its zeros; and
    the transfer frnnction of one ZP circuit in each pair exhibits a positive zero and the transfer function of the other ZP circuit in each pair exhibits a negative zero.

2. The invention of claim 1, wherein the cascade of one or more circuit blocks maintains a substantially constant group delay.

3. The invention of claim 1, wherein the cascade of one or more circuit blocks maintains a zero group delay.

4. The invention of claim 1, wherein, when the equalizer is connected to receive an input signal from a transmission channel, the equalizer is capable of compensating for group delay distortion in the input signal introduced by the transmission channel.

5. The invention of claim 4, wherein the compensating is achieved by adaptively choosing an appropriate RC time constant for each ZP circuit.

6. The invention of claim 1, wherein the cascade has two or more circuit blocks, and the circuit blocks in the cascade have identical design.

7. The invention of claim 1, wherein the cascade has two or more circuit blocks, and frirther comprising a selector, wherein the output of each block in the cascade is fed to the selector, which is adapted to select one of the block outputs as the output of the cascade.

8. The invention of claim 1, wherein at least one ZP circuit is implemented using one or more tunable capacitors that enable the frequency response of the at least one ZP circuit to be adjusted.

9. The invention of claim 8, wherein at least one tunable capacitor is implemented via a binary weighted capacitor array that is digitally programmable.

10. The invention of claim 8, where at least one tunable capacitor is controlled in response to characteristics of received data.

11. The invention of claim 1, wherein at least one ZP circuit is implemented using no more than fifty transistors.

12. The invention of claim 1, wherein at least one ZP circuit is implemented using no more than ten transistors.

13. The invention of claim 1, wherein at least one terminal of at least one transistor of at least one ZP circuit is coupled to a power supply via an active load.

14. The invention of claim 1, wherein transistors of at least one ZP circuit are configured to process differential inputs and produce differential outputs.

15. The invention of claim 1, wherein at least one ZP circuit comprises first, second, third, and fourth transistors, each transistor having a conduction path between first and second terminals, the conduction of the conduction path controlled by an electrical signal applied to a third terminal of said each transistor, wherein:
    the first terminal of each transistor of a first pair of the four transistors are coupled to each other to form a first output of the ZP circuit, and coupled via a first load to a supply voltage;
    the first terminal of each transistor of a second pair of the four transistors are coupled to each other to form a second output of the ZP circuit, and coupled via a second load to the supply voltage;
the second terminal of each of the four transistors is coupled to an associated current source;
the second terminal of each of the first and second transistors is additionally coupled to ground via an associated capacitor;
the second terminals of the third and fourth transistors are additionally coupled to each other via a resistor;
the third terminals of the first and third transistors are coupled to each other and to a first input to the ZP circuit; and
the third terminals of the second and fourth transistors are coupled to each other and to a second input to the ZP circuit.

16. The invention of claim 15, wherein the first transistor pair comprises the first and fourth transistors, and the second transistor pair comprises the second and third transistors.

17. The invention of claim 15, wherein the first transistor pair comprises the first and third transistors, and the second transistor pair comprises the second and fourth transistors.

18. The invention of claim 15, wherein the first and second loads are complex loads.

19. The invention of claim 15, wherein the first and second loads are active loads.

20. A method of receive-side channel equalization comprising:
  (a) receiving a signal from a transmission channel at a cascade of one or more circuit blocks, each block comprising a pair of zero-positioning (ZP) circuits, wherein each ZP circuit is adapted to adjust at least one of its zeros; and the transfer function of one ZP circuit in each pair exhibits a positive zero and the transfer function of the other ZP circuit in each pair exhibits a negative zero;
  (b) processing the signal with the cascade; and
  (c) outputting the result of the processing.

21. The invention of claim 20, wherein processing the signal comprises compensating for group delay distortion in the signal introduced by the transmission channel, wherein the compensating is achieved by adaptively choosing an appropriate RC time constant for each ZP circuit.

22. The invention of claim 20, wherein the cascade has two or more circuit blocks, and the method comprises:
  making each block output available to a selector, and
  selecting, via the selector, one of these block outputs as the output of the cascade.

23. The invention of claim 20, wherein one or more tunable capacitors are used within at least one ZP circuit to adjust the frequency response of each ZP circuit.

24. The invention of claim 20, wherein at least one ZP circuit comprises first, second, third, and fourth transistors, each transistor having a conduction path between first and second terminals, the conduction of the conduction path controlled by an electrical signal applied to a third terminal of said each transistor, wherein:
  the first terminal of each transistor of a first pair of the four transistors are coupled to each other to form a first output of the ZP circuit, and coupled via a first load to a supply voltage;
  the first terminal of each transistor of a second pair of the four transistors are coupled to each other to form a second output of the ZP circuit, and coupled via a second load to the supply voltage;
  the second terminal of each of the four transistors is coupled to an associated current source;
  the second terminal of each of the first and second transistors is additionally coupled to ground via an associated capacitor;
  the second terminals of the third and fourth transistors are additionally coupled to each other via a resistor;
  the third terminals of the first and third transistors are coupled to each other and to a first input to the ZP circuit; and
  the third terminals of the second and fourth transistors are coupled to each other and to a second input to the ZP circuit.

25. A receive-side channel equalizer comprising:
  a cascade of circuit blocks, each block comprising a pair of zero-positioning (ZP) circuits, wherein the transfer function of one ZP circuit in each pair exhibits a positive zero and the transfer function of the other ZP circuit in each pair exhibits a negative zero; and
  a selector, wherein the output of each block in the cascade is fed to the selector, which is adapted to select one of the block outputs as the output of the cascade.

26. A receive-side channel equalizer comprising a cascade of one or more circuit blocks, each block comprising a pair of zero-positioning (ZP) circuits, wherein:
  the transfer function of one ZP circuit in each pair exhibits a positive zero and the transfer function of the other ZP circuit in each pair exhibits a negative zero;
  at least one ZP circuit comprises first, second, third, and fourth transistors, each transistor having a conduction path between first and secondq terminals, the conduction of the conduction path controlled by an electrical signal applied to a third terminal of said each transistor;
  the first terminal of each transistor of a first pair of the four transistors are coupled to each other to form a first output of the ZP circuit, and coupled via a first load to a supply voltage;
  the first terminal of each transistor of a second pair of the four transistors are coupled to each other to form a second output of the ZP circuit, and coupled via a second load to the supply voltage;
  the second terminal of each of the four transistors is coupled to an associated current source;
  the second terminal of each of the first and second transistors is additionally coupled to ground via an associated capacitor;
  the second terminals of the third and fourth transistors are additionally coupled to each other via a resistor;
  the third terminals of the first and third transistors are coupled to each other and to a first input to the ZP circuit; and
  the third terminals of the second and fourth transistors are coupled to each other and to a second input to the ZP circuit.

27. A method of receive-side channel equalization comprising:
  (a) receiving a signal from a transmission channel at a cascade of circuit blocks, each block comprising a pair of zero-positioning (ZP) circuits, wherein the transfer function of one ZP circuit in each pair exhibits a positive zero and the transfer function of the other ZP circuit in each pair exhibits a negative zero;
  (b) processing the signal with the cascade;
  (c) outputting the result of the processing;
  (d) making each block output available to a selector; and
  (e) selecting, via the selector, one of these block outputs as the output of the cascade.

28. A method of receive-side channel equalization comprising:

(a) receiving a signal from a transmission channel at a cascade of one or more circuit blocks, each block comprising a pair of zero-positioning (ZP) circuits, wherein the transfer function of one ZP circuit in each pair exhibits a positive zero and the transfer function of the other ZP circuit in each pair exhibits a negative zero;
(b) processing the signal with the cascade; and
(c) outputting the result of the processing; wherein:
   at least one ZP circuit comprises first, second, third, and fourth transistors, each transistor having a conduction path between first and second terminals, the conduction of the conduction path controlled by an electrical signal applied to a third terminal of said each transistor;
   the first terminal of each transistor of a first pair of the four transistors are coupled to each other to form a first output of the ZP circuit, and coupled via a first load to a supply voltage;
   the first terminal of each transistor of a second pair of the four transistors are coupled to each other to form a second output of the ZP circuit, and coupled via a second load to the supply voltage;
   the second terminal of each of the four transistors is coupled to an associated current source;
   the second terminal of each of the first and second transistors is additionally coupled to ground via an associated capacitor;
   the second terminals of the third and fourth transistors are additionally coupled to each other via a resistor;
   the third terminals of the first and third transistors are coupled to each other and to a first input to the ZP circuit; and
   the third terminals of the second and fourth transistors are coupled to each other and to a second input to the ZP circuit.

* * * * *

UNITED STATES PATENT AND TRADEMARK OFFICE
CERTIFICATE OF CORRECTION

PATENT NO. : 7,164,711 B2 Page 1 of 1
APPLICATION NO. : 10/348871
DATED : January 16, 2007
INVENTOR(S) : Fuji Yang et al.

It is certified that error appears in the above-identified patent and that said Letters Patent is hereby corrected as shown below:

1. In column 6, line 11, replace "frmnction" with --function--;
2. In column 6, line 31, replace "frirther" with --further--;
3. In column 7, line 56, replace "tenninal" with --terminal--;
4. In column 7, line 58, replace "tenninal" with --terminal--;
5. In column 7, line 62, replace "tenninal" with --terminal--;
6. In column 7, line 66, replace "tenninal" with --terminal--;
7. In column 8, line 1, replace "tenninal" with --terminal--;
8. In column 8, line 4, replace "tenninals" with --terminals--;
9. In column 8, line 6, replace "tenninals" with --terminals--;
10. In column 8, line 9, replace "tenninals" with --terminals--; and
11. In column 8, line 29, replace "secondq" with --second--.

Signed and Sealed this

Tenth Day of April, 2007

JON W. DUDAS
*Director of the United States Patent and Trademark Office*